Patented Feb. 7, 1950

2,496,594

UNITED STATES PATENT OFFICE 2,496,594

FORMALDEHYDE CORROSION INHIBITOR COMPOSITIONS

Melvin I. Moyer, Pawhuska, and Joseph M. Hersh, Bartlesville, Okla., assignors to Cities Service Oil Company, Bartlesville, Okla., a corporation of Delaware No Drawing. Application September 11, 1947, Serial No. 773,505

1 Claim. (Cl. 252—8.55)

This invention relates to inhibiting corrosion of metals, and is more particularly concerned with improved compositions and processes for treating natural oil-brine mixtures to reduce their corrosive action upon production, transmission, and other oil field equipment.

It is a well known fact that many oil producing formations yield with the crude, a brine which is extremely corrosive in its action upon metal tubing, casings, pumps and other oil producing and collection equipment; and that this type of corrosion is particularly noticeable in wells producing connate brines containing dissolved hydrogen sulfide. In an effort to reduce the cost of maintaining production and collection equipment, it has heretofore been the practice to treat corrosive oil brine mixtures with caustic soda, soda ash, and other alkaline solutions in such proportion as to neutralize the acidic sulfur components. These neutralization treatments obviously require the introduction into the well of very considerable amounts of the treating agents, are correspondingly expensive, and have not, in the main, proven altogether satisfactory. More recently it has been found that the introduction of small quantities of formaldehyde into brine producing oil wells has a marked effect in reducing corrosion losses, and in a way which does not appear to bear any direct relation to simple neutralization of acidic sulfur constituents. The amount of formaldehyde which must be employed for this purpose is, however, sufficiently great so that its cost still represents a substantial item of maintenance, and the results obtained in the way of reducing corrosion, while very substantial and highly beneficial, are far less than perfect.

The principal object of our invention is to provide compositions which may be economically employed in treating oil-brine mixtures, and especially those containing acidic sulfur compounds such as hydrogen sulfide, to inhibit the corrosivity of such brine to a very marked extent, and to reduce to a corresponding degree, the cost of maintenance equipment employed in producing the oil.

It is a further object of our invention to provide an improved process for protecting oil well production and transmission equipment against loss by the corrosive action of brines and other materials taken from wells along with a greater or lesser amount of crude oil.

We have discovered that solutions of formaldehyde and an organic compound containing at least one amino-reactive group are markedly and unexpectedly more effective in inhibiting corrosive action of oil well brines than formaldehyde alone. While most of the amino-reactive compounds which we have tried are individually less effective than formaldehyde as corrosion inhibitors for oil brines, the use of a minor proportion of any of them along with formaldehyde gives a quite unexpected increase in inhibiting effectiveness. Thus we have found that alkylamines, alkanol amines, aryl amines, alkylamino phenols, alkyl amino phenylene diamines, heterocyclic amines, ureas, and ammonia which may be regarded as an amine, generally have the effect of materially improving the corrosion inhibiting power of a formaldehyde solution.

The compositions which we have found to be particularly effective contain from about 2½ to 25 parts by weight of amino reactive type of compound and from about 97½ to 75 parts by weight of formaldehyde. It is to be understood, of course, that while these compounds may be used in these ratios with respect to each other, they are nevertheless most effectively used in water solutions. In this connection we have found that formaldehyde solutions containing from about 5 to 25 per cent of formaldehyde are just as effective on an equivalent formaldehyde basis as 37 per cent U. S. P. formalin, provided, of course, that the desired ratio of HCHO to amino-reactive compound is maintained within the limits indicated, the additional water serving as a diluent which has no material effect.

The effectiveness of our composition in inhibiting the corrosivity of oil field brines may be better and more fully understood by reference to certain tests which we have conducted, using both natural brines taken from producing oil wells and artificial brines of comparable saline content. It is of note, however, that all of these test brines were adjusted to a dissolved hydrogen sulfide content of 1000 parts per million by weight, which is representative of the acidic sulfur content of the more corrosive connate brines. The test procedure involved a measurement of the corrosive action of these brines, as inhibited with our compositions, upon thoroughly cleaned and polished strips of cold rolled steel measuring 4" x ½" x 16–18 gauge, under conditions closely approximating those existing in a producing oil well, and a comparison thereof with the results obtained by subjecting identical test strips to the corrosive action of the brines alone, and to the brines as inhibited with formaldehyde.

In preparing the test solutions we introduced a measured quantity of inhibitor—one of our compositions of formaldehyde and amino-reactive compounds—to a clean 16 ounce bottle, hung the metal test strip in place on a glass hook, and then filled the bottle with natural gas to exclude air. Following that, a measured quantity of brine was added in such a way as to carry in as little air as possible and to maintain the inhibited solution under an atmosphere of natural gas. Each test bottle was then carefully sealed with a tightly fitting stopper to the end that the conditions of test might simulate as far as possible the natural corrosive conditions existing in brine-producing oil wells. These same precautions were, of course, observed in preparing solutions containing formaldehyde as an inhibitor in accordance with prior art practice, and those in which the test samples were subjected to the corrosive action of uninhibited brines. It is of further note that all tests were run in multiple to avoid anomalies of testing.

In this series of tests the inhibited solutions each contained 62½ parts of one of our compositions, or of formaldehyde alone, as the case may be, per million parts of brine, and the tests were run for 14 days. At the end of the test period the strips were removed from the brine solutions and dipped in 1% hydrochloric acid cleaning solution for a uniform time, rinsed with water and wiped with a soft cloth to remove any loose scale, and were then subjected to further rinsing in a solution of methanol, acetone and dimethylacetal for the purpose of removing water, etc. At the end of that preparatory treatment the strips were dried and weighed to determine the change in weight during the corrosion test. At this point it may be noted that the strips removed from the uninhibited brine solution were coated with a gray, flocculent film of which some had flaked off during the course of the test to leave the brine in a turbid condition. Those taken from the solutions which were inhibited with formaldehyde alone had a similar but harder coating which was, however, readily removed in the cleaning process. In the case of the strips taken from brines inhibited with our various compositions, it was observed that the deposited films were of a highly tenacious character, resisting both mechanical abrasion and chemical cleaning. In some instances, for example, it was found that the standard cleaning treatment referred to above had substantially no effect upon the film, with the result that the test strip showed a gain in weight during the test procedure.

The changes in weight of the test strips during the corrosion test were taken as a measure of the effectiveness of the inhibitor compositions. Thus we calculated a protection value for each of the test strips taken from the inhibited solution in accordance with the following formula:

$$\frac{L_1 - L_2}{L_1} \times 100$$

in which $L_1$ is the loss in weight of strips taken from uninhibited brine solutions, and $L_2$ is the loss in weight of strips which were subjected to the several inhibited brine solutions. Based upon this calculated protection value, we made a further calculation of the effectiveness of each of our compositions with respect to formaldehyde alone. The results of these test calculations are summarized in Table I:

TABLE I

| Agent used with Formaldehyde | Ratio Agent to Formaldehyde | Protection Value | Per Cent Effectiveness relative to Formaldehyde |
|---|---|---|---|
| SECTION "A" | | | |
| Formaldehyde (alone) | 1:9 | 48 | 100 |
| monoethanol amine | 1:9 | 94 | 195 |
| Triethanol amine | 1:9 | 88 | 183 |
| mono-amyl amine | 1:9 | 101 | 211 |
| di-amyl-amine | 1:9 | 98 | 204 |
| triamyl amine | 1:9 | 80 | 167 |
| tributyl amine | 1:9 | 87 | 181 |
| aniline | 1:9 | 81 | 170 |
| melamine | 1:9 | 116 | 242 |
| hexamine | 1:9 | 112 | 233 |
| urea | 1:9 | 73 | 145 |
| thiourea | 1:9 | 92 | 192 |
| dibutyl thiourea | 1:9 | 63 | 131 |
| SECTION "B" | | | |
| Formaldehyde (alone) | | 31 | 100 |
| n-butyl-p-aminophenol | 1:9 | 84 | 271 |
| i-butyl-p-aminophenol | 1:9 | 70 | 226 |
| di-sec.butyl-p-phenylene-2, 5-diamine | 1:9 | 78 | 252 |
| ammonia [1] | 1:18 | 82 | 265 |
| Diethyl thiourea | 1:9 | 72 | 232 |

[1] Theoretical equivalent of 1 part hexamine to 9 parts formaldehyde

The tests reported in Section "A" of the table were made on a somewhat less corrosive brine than those covered by Section "B," as is evident from the difference in the protection values shown by these brines when inhibited with formaldehyde alone. This reflects the well known fact that brines taken from different wells will show different degrees of corrosivity even though having the same apparent salt and hydrogen sulfide content. In addition, it will be observed that several of our compositions give protection values in excess of 100. This necessarily means that the test strips taken from brines inhibited with these compositions were coated with films which were not removed by standard cleaning treatment. Instead of a weight loss, therefore, these particular test strips showed a weight gain, an indication that the amount of inhibitor employed was in excess of that actually required to assure good protection.

The unusual effectiveness of our inhibiting compositions is most clearly indicated by the data given in the last column of the table. Thus it will be observed that every one of our compositions of formaldehyde and an amino-reactive compound was materially more effective than the formaldehyde alone, in general approaching 200 per cent of the effectiveness of formaldehyde as a standard of comparison. It is of note, too, that the comparison which is made in this column, eliminates the effect of the use of different brines, and thus makes the tests reported in Section "A" directly comparable with that of Section "B."

The foregoing series of tests was carried out on an inhibitor composition in which the ratio of amino-reactive compounds to formaldehyde was, with one exception, maintained at a constant value of 1:9. That exception, ammonia, is more apparent than real because the ratio of ingredients in this particular instance is that which is theoretically required to yield 1 part of hexamine in 9 parts of formaldehyde. The effect of varying the ratio of amino-reactive compound to formaldehyde is shown in Table II below, summarizing the results of another series of tests carried out in precisely the manner hereinbefore described. In these tests, as in the one previously described, the inhibitor concentration was standardized, for test purposes, at 62½ parts of amino-reactive compound-formaldehyde composition per million parts of brine; and the brine employed was the same as that used in the tests reported in Section "B" above.

TABLE II

| Agent used with Formaldehyde | Ratio Agent to HCHO | Protection Value | Per cent Effectiveness relative to HCHO |
|---|---|---|---|
| Formaldehyde (alone) | | 31 | 100 |
| monoethanol amine | 1:9 | 72 | 232 |
| Do | 2:9 | 82 | .265 |
| melamine | 1:24 | 79 | 255 |
| Do | 6:100 | 84 | 271 |
| Do | 1:9 | 99 | 319 |
| Do | 2:9 | 107 | 345 |
| hexamine | 1:24 | 65 | 210 |
| Do | 6:100 | 77 | 243 |
| Do | 1:9 | 78 | 252 |
| Do | 2:9 | 93 | 300 |
| ammonia | 1:20 | 82 | 265 |
| Do | 1:10 | 83 | 268 |
| Do | 1:5 | 88 | 284 |
| thiourea | 1:24 | 56 | 181 |
| Do | 6:100 | 65 | 210 |
| Do | 1:9 | 54 | 174 |
| Do | 2:9 | 62 | 200 |

It will be observed, that while this test covered only a few of our many inhibitor compositions, the results clearly show what we have found to be the general rule, namely, that the greater the proportion of amino-reactive improving agent to formaldehyde, up to a point, the greater is the effectiveness of the resulting composition. Since the cost of formaldehyde is considerably lower than that of the amino-reactive improving agents, it is desirable to use as little of the latter as is possible, consistent with obtaining a desired degree of corrosion inhibition. In general, 20 per cent of improving agents suffices to yield an effective inhibiting composition, and in a great many cases compositions containing considerably lower percentages of the amino-reactive compounds, have proven to be entirely adequate. Thus we have found that a composition of 10 per cent hexamine and 90 per cent formaldehyde is outstandingly advantageous, both from the point of view of inhibition effectiveness and of cost. Ammonia-formaldehyde compositions in a ratio of about 1:20 by weight percentage are fully comparable with the hexamine-formaldehyde solutions, both in efficiency and from the standpoint of cost, while compositions of 10 per cent melamine and 90 per cent formaldehyde, give outstanding protection against corrosion even though the cost of preparation may be somewhat higher than that of the other preferred inhibitors. It will be understood, of course, that these percentages are all based upon the total weight of formaldehyde plus the amino-reactive improving compounds, and do not take into account the present of water which may represent as much as 95 per cent of the complete treating compositions.

The high degree of effectiveness of the ammonia-formaldehyde compositions listed in both of the tables may be partially explained by the known reaction of these compounds to produce hexamine, which itself has been shown to be unusually effective in solution with formaldehyde. Other amino compounds of the type with which we are concerned are also known to react with formaldehyde to produce organic complexes of the general nature of hexamine. Our invention therefore contemplates not only compositions of amino compounds and formaldehyde, but also the reaction products of the amines and amino-reactive compounds (including ammonia) with formaldehyde.

In using our improved composition for protecting oil well tubing, casing, and other equipment which comes in contact with corrosive oil-brine production, we find that excellent results may be obtained by injecting an appropriate quantity of a selected composition into a producing well so that it may mingle with the oil-brine mixture and come into contact with the casing, tubing, pumps and other producing equipment. We may, for example, introduce the inhibiting composition into the top of the casing, thus causing it to flow down into the well and thence back through the tubing, etc. In general we have found that this procedure suffices to inhibit corrosion throughout the entire system of production, and collection, even including field tankage. In treating a particular oil well, however, portions of the composition may be introduced at the bottom of the well, and at various elevations, in the tubing, piping, pumping and storage equipment, and in fact at any point where its presence is required to limit corrosive action. We further found that the introduction may be made on an intermittent or continuous basis as particular conditions warrant, and that the introduction should be continued in sufficient quantity, and for a sufficient length of time to permit the formation of a protecting film on the metal parts of the oil handling equipment.

It is further to be noted that we prefer to introduce our inhibiting compositions in the form of liquid solutions of formaldehyde and the amino-reactive compounds. Most of the latter compounds are readily soluble in water, but others such as the alkyl aminophenols, even though slightly soluble, may readily be used in water solution because of the relatively small proportions required. Thus it is usually possible to dissolve the amino-reaction improving agent directly in a commercially available formaldehyde-water solution to form a liquid composition which readily passes into solution in a corrosive brine to assure adequate distribution, etc. If desired, however, the solution may be made up in alcohol or any other appropriate vehicle.

The amount of inhibiting composition which is used for treating purposes will, of course, depend upon the proportions in which oil and brine are present, the degree of corrosivity of the particular brine, and other factors. We have found that a concentration of about 62½ parts per million of active inhibiting ingredients (formaldehyde and amino-reactive compound), to each million parts of brine, generally suffices to give good inhibiting effect. In some instances, however, it is possible to employ as little as 30 parts inhibitor per million of brine, while in other instances as much as 150 parts per million of inhibitor may be required to assure satisfactory protection. Under actual operating conditions we contemplate the use of even higher concentrations of inhibitor, primarily as a precautionary measure to meet unusually corrosive conditions, as well as less than 30 p. p. m. where corrosive conditions are less pronounced.

The nature of the inhibiting action of our improved composition is not fully understood. We have noted, however, that in most cases the metal which is exposed to hydrogen sulfide containing brines, in the presence of one of our compositions, develops a dense film of a highly tenacious character. Those resulting from the use of our melamine and hexamine compositions, for example, are of a varnish-like nature and are not readily removed, even with a 1 per cent hydrochloric acid solution. These films, as well as those resulting from the use of other of our compositions, are generally insoluble in hot or cold water, ammonium citrate solution, or in organic solvents such as alcohols, acetones, ethers, benzene, gasoline, kerosine, carbon tetrachloride, chloroform, or tetrachloroethane, and they all resist mechanical abrasion to a greater or lesser extent.

In view of the nature of these films it is thought that they act as protecting coatings, thus explaining the inhibiting action of our new compositions. This much is true: The inhibitors do not act merely to neutralize the acidic sulfur components of the oil well brine which we have encountered, as is very evident from the presence of large amounts of hydrogen sulfide in brines which have been under test for relatively long periods of time, and where excellent corrosion inhibiting effect has been obtained.

It is to be understood that the improved compositions of our invention are not limited to use alone, but may be employed along with other agents commonly introduced into producing oil wells for breaking emulsions, limiting scale formation, etc. It is furthermore evident that our invention is not restricted to the use of improved compositions for inhibiting corrosion in oil wells but may be employed to perform this function in the presence of corrosive brines of other origin.

Reference is made to applicants' copending application Serial No. 773,506, relating to amino-reactive compounds alone as well-treating agents.

Having described our invention and illustrated it by way of specific examples, what we claim as new and useful is:

The process of preventing the corrosion of metals when exposed to oil well brine containing sulfur compounds which comprises incorporating in the corrosive material a corrosion inhibiting composition comprising formaldehyde and ammonia in the ratio of from 5 to 20 parts of formaldehyde to one part of ammonia, and containing the reaction products of formaldehyde and ammonia when mixed in these proportions.

MELVIN I. MOYER.
JOSEPH M. HERSH.

REFERENCES CITED

The following references are of record in the file of this patent:

UNITED STATES PATENTS

| Number | Name | Date |
|---|---|---|
| 2,197,357 | Widmer | Apr. 16, 1940 |
| 2,426,318 | Menaul | Aug. 26, 1947 |
| 2,437,475 | Oxford | Mar. 9, 1948 |

OTHER REFERENCES

Chemical Abstracts, vol. 38, page 1870, 1944, Digest of Canadian Patent 417,444.

Formaldehyde vs. Sulfide Corrosion, Article in Industrial and Engineering Chemistry, vol. 38, pages 10 and 14, January 16, 1946.

Menaul et al., Preventing Corrosion in Gas-Condensate Wells, Article in Petroleum Technology, July 1947, Tech. Pub. No. 2,229.